(12) United States Patent
Liberg et al.

(10) Patent No.: US 11,044,750 B2
(45) Date of Patent: Jun. 22, 2021

(54) METHODS AND ARRANGEMENTS FOR MANAGING INFORMATION ABOUT SIGNAL QUALITY AND/OR SIGNAL STRENGTH RECEIVED BY A WIRELESS DEVICE IN A DOWNLINK

(71) Applicant: Telefonaktiebolaget LM Ericsson (publ), Stockholm (SE)

(72) Inventors: Olof Liberg, Stockholm (SE); John Walter Diachina, Garner, NC (US); Stefan Eriksson Löwenmark, Färentuna (SE); Mårten Sundberg, Årsta (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 15/528,005

(22) PCT Filed: Jan. 20, 2017

(86) PCT No.: PCT/SE2017/050056
§ 371 (c)(1),
(2) Date: May 18, 2017

(87) PCT Pub. No.: WO2017/127016
PCT Pub. Date: Jul. 27, 2017

(65) Prior Publication Data
US 2018/0110068 A1 Apr. 19, 2018

Related U.S. Application Data

(60) Provisional application No. 62/281,937, filed on Jan. 22, 2016.

(51) Int. Cl.
*H04W 4/00* (2018.01)
*H04W 74/00* (2009.01)
(Continued)

(52) U.S. Cl.
CPC ......... *H04W 74/006* (2013.01); *H04L 1/0026* (2013.01); *H04W 74/008* (2013.01); *H04W 4/70* (2018.02)

(58) Field of Classification Search
USPC ................ 370/252, 328, 329, 242, 318, 465
See application file for complete search history.

(56) References Cited

U.S. PATENT DOCUMENTS

2008/0095185 A1* 4/2008 DiGirolamo .......... H04L 1/0026
370/464
2011/0195707 A1* 8/2011 Faerber ................. H04W 24/08
455/423

(Continued)

FOREIGN PATENT DOCUMENTS

CN  102710383 A  10/2012
CN  102883346 A  1/2013

(Continued)

OTHER PUBLICATIONS

3GPP, "3rd Generation Partnership Project; Technical Specification Group GSM/EDGE Radio Access Network; Cellular System Support for Ultra Low Complexity and Low Throughput Internet of Things; (Release 13)", 3GPP TR 45.820 V1.0.0, Mar. 2015, 1-165.

(Continued)

*Primary Examiner* — Phuongchau Ba Nguyen
(74) *Attorney, Agent, or Firm* — Murphy, Bilak & Homiller, PLLC

(57) ABSTRACT

Methods, wireless device (120; 400) and wireless communication network (100), such as a network node (110; 600) thereof, for managing downlink signal information. The downlink signal information being information about signal quality and/or signal strength received by the wireless device (120) in a downlink. The wireless device (120) sends (203; 302), to the wireless communication network (100), a message indicating said obtained downlink signal informa- (Continued)

tion and which message is associated with the wireless device (120) requesting access to the wireless communication network (100). The downlink information being indicated in the message by a range that indicates how much the obtained downlink signal information exceeds a certain threshold. The range is determined based on a certain factor that the wireless communication network (100) has informed the wireless device (120) about.

30 Claims, 5 Drawing Sheets

(51) Int. Cl.
 *H04L 1/00* (2006.01)
 *H04W 4/70* (2018.01)

(56) References Cited

U.S. PATENT DOCUMENTS

| 2016/0157251 A1* | 6/2016 | Schliwa-Bertling | H04W 4/70 370/315 |
|---|---|---|---|
| 2018/0110068 A1 | 4/2018 | Liberg et al. | |

FOREIGN PATENT DOCUMENTS

| CN | 103313276 A | 9/2013 |
|---|---|---|
| CN | 103369609 A | 10/2013 |
| RU | 2474080 C2 | 1/2013 |
| WO | 2008051466 A2 | 5/2008 |
| WO | 2015199422 A1 | 12/2015 |

OTHER PUBLICATIONS

3GPP, "3rd Generation Partnership Project; Technical Specification Group GSM/EDGE Radio Access Network; Cellular system support for ultra-low complexity and low throughput Internet of Things (CIoT) (Release 13)", 3GPP TR 45.820 V13.0.0 (Aug. 2015), Aug. 2015, 1-495.

Unknown, Author, "Alignment of Coverage Classes for EC-EGPRS—telco#3", 3GPP TSG GERAN#69, Tdoc GP-160xxx, St. Julians, Malta, Ericsson, Feb. 15-18, 2016, 1-9.

Unknown, Author, "Introduction of EC-EGPRS and PEO", 3GPP TSG-GERAN Meeting #68, GP-151111, Anaheim, USA, Nov. 16-20, 2015, 1-40.

Unknown, Author, "Introduction of system information for EC-EGPRS", 3GPP TSG GERAN#68, GP-151112, Anaheim, United States, Nov. 16-20, 2015, 1-13.

Unknown, Author, "New Work Item on Extended Coverage GSM (EC-GSM) for support of Cellular Internet of Things", 3GPP TSG GERAN#67, GP-151039, Yinchuan, P.R. China, Aug. 10-14, 2015, 1-7.

Unknown, Author, "On the EC-EGPRSChannel Request message content", 3GPP TSG GERAN#69, GP-160036, St. Juliens, Malta, Ericsson LM, Feb. 15-18, 2015, 1-7.

Unknown, Author, "Presentation of Specification/Report to TSG: TR 45.820, Version 1.0.0", 3GPP GERAN Meeting #65, GP-150317, Shanghai, China, Mar. 9-13, 2015, 1-1.

Unknown, Author, "System impact from power control settings on EC-RACH", 3GPP TSG GERAN #68, GP-151126, Anaheim, USA, Ericsson LM, Nov. 16-19, 2015, 1-5.

* cited by examiner

METHODS AND ARRANGEMENTS FOR MANAGING INFORMATION ABOUT SIGNAL QUALITY AND/OR SIGNAL STRENGTH RECEIVED BY A WIRELESS DEVICE IN A DOWNLINK

TECHNICAL FIELD

Embodiments herein relate to methods and arrangements in a wireless communication network, e.g. telecommunication network, for managing information about signal quality and/or signal strength received by a wireless device in a downlink.

BACKGROUND

Communication devices such as wireless communication devices, that simply may be named wireless devices, may also be known as e.g. User Equipments (UEs), mobile terminals, wireless terminals and/or Mobile Stations (MS). A wireless device is enabled to communicate wirelessly in a wireless communication network that typically is a cellular communications network, which may also be referred to as a wireless communication system, or radio communication system, sometimes also referred to as a cellular radio system, cellular network or cellular communication system. A wireless communication network may sometimes simply be referred to as a network and may be abbreviated NW. The communication may be performed e.g. between two wireless devices, between a wireless device and a regular telephone and/or between a wireless device and a server via a Radio Access Network (RAN) and possibly one or more Core Networks (CN), comprised within the wireless communication network. The wireless device may further be referred to as a mobile telephone, cellular telephone, laptop, Personal Digital Assistant (PDA), tablet computer, just to mention some further examples. Wireless devices may be so called Machine to Machine (M2M) devices or Machine Type of Communication (MTC) devices, i.e. a device that is not necessarily associated with a conventional user, such as a human, directly using the device.

The wireless device may be, for example, portable, pocket-storable, hand-held, computer-comprised, or vehicle-mounted mobile device, enabled to communicate voice and/or data, via the RAN, with another entity, such as another wireless device or a server.

The cellular communication network covers a geographical area which is divided into cell areas, wherein each cell area is served by at least one base station, or Base Station (BS), e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is typically identified by one or more cell identities. The base station at a base station site provides radio coverage for one or more cells. A cell is thus associated with a geographical area where radio coverage for that cell is provided by the base station at the base station site. Cells may overlap so that several cells cover the same geographical area. By the base station providing or serving a cell is meant that the base station provides radio coverage such that one or more wireless devices located in the geographical area where the radio coverage is provided may be served by the base station in said cell. When a wireless device is said to be served in or by a cell this implies that the wireless device is served by the base station providing radio coverage for the cell. One base station may serve one or several cells. Further, each base station may support one or several communication technologies. The base stations communicate over the air interface operating on radio frequencies with the wireless device within range of the base stations.

In some RANs, several base stations may be connected, e.g. by landlines or microwave, to a radio network controller, e.g. a Radio Network Controller (RNC) in Universal Mobile Telecommunication System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communication (originally: Groupe Spécial Mobile).

In 3rd Generation Partnership Project (3GPP) Long Term Evolution (LTE), base stations, which may be referred to as eNodeBs or eNBs, may be directly connected to other base stations and may be directly connected to one or more core networks.

UMTS is a third generation mobile communication system, which may be referred to as 3rd generation or 3G, and which evolved from the GSM, and provides improved mobile communication services based on Wideband Code Division Multiple Access (WCDMA) access technology. UMTS Terrestrial Radio Access Network (UTRAN) is essentially a radio access network using wideband code division multiple access for wireless devices.

General Packet Radio Service (GPRS) is a packet oriented mobile data service on the 2G cellular communication system's global system for mobile communications (GSM).

Enhanced Data rates for GSM Evolution (EDGE) also known as Enhanced GPRS (EGPRS), or IMT Single Carrier (IMT-SC), or Enhanced Data rates for Global Evolution is a digital mobile phone technology that allows improved data transmission rates as a backward-compatible extension of GSM.

High Speed Packet Access (HSPA) is an amalgamation of two mobile telephony protocols, High Speed Downlink Packet Access (HSDPA) and High Speed Uplink Packet Access (HSUPA), defined by the 3rd Generation Partnership Project (3GPP), that extends and improves the performance of existing 3rd generation mobile telecommunication networks utilizing the WCDMA. Such networks may be named WCDMA/HSPA.

In 3GPP Long Term Evolution (LTE), which may be referred to as 4th generation or 4G, base stations, which may be referred to as eNodeBs or eNBs, may be directly connected to other base stations and may be directly connected to one or more core networks.

The 3GPP has undertaken to evolve further the UTRAN and GSM based radio access network technologies, for example into evolved UTRAN (E-UTRAN) used in LTE.

The expression downlink, which may be abbreviated DL, is used for the transmission path from the base station to the wireless device. The expression uplink, which may be abbreviated UL, is used for the transmission path in the opposite direction i.e. from the wireless device to the base station.

Machine Type of Communication (MTC) has in recent years, especially in the context of the Internet of Things (IoT), shown to be a growing market segment for cellular technologies, especially for GSM/EDGE with its more or less global coverage, ubiquitous connectivity and price competitive devices. Realization of IoT benefit from utilizing cellular technologies and GSM technology is of great, perhaps of greatest, interest to utilize at least initially. In general it is desirable to be able to (re)use existing wireless communication systems and cellular technologies for new type of devices such as MTC devices. An MTC device is typically a wireless device that is a self and/or automatically controlled unattended machine and that is typically not associated with an active human user in order to generate data traffic. A MTC device is typically much more simple, and associated with a more specific application or purpose, than and in contrast to a conventional mobile phone or smart phone. MTC involves communication to and/or from MTC devices, which communication typically is of quite different nature and with other requirements than communication associated with e.g. conventional mobile phones and smart phones. In the context of and growth of the IoT it is evidently so that MTC traffic will be increasing and thus needs to be increasingly supported in wireless communication systems.

A problem related to (re)using existing technologies and systems is that the requirements for the new type of devices are typically different than conventional requirements, e.g. regarding the type and amount of traffic, performance etc. Existing systems have not been developed with these new requirements in mind. Also, traffic generated by new type of devices will typically be in addition to conventional traffic already supported by an existing system, which existing traffic typically needs to continue to be supported by and in the system, preferably without any substantial disturbance and/or deterioration of already supported services and performance.

Any modifications need of existing systems and technology should of course be cost efficient, such as enabled by low complexity modifications, and preferably allowing legacy devices already being employed to continue to be used and co-exist with the new type of devices in one and the same wireless communication network.

3GPP GERAN did under 3GPP release 13 perform a study to distinguish cellular technologies suitable to support Internet of Things (IoT) services in cellular networks. The report summarizing this work is found in 3GPP TR 45.820 V13.0.0, "Cellular System Support for Ultra Low Complexity and Low Throughput Internet of Things".

As a consequence of the conclusion in 3GPP TR 45.820 V13.0.0 a 3GPP Work Item (WI) on Extended Coverage GSM (EC-GSM-IoT) was approved in GP-151039, "New Work Item on Extended Coverage GSM (EC-GSM) for support of Cellular Internet of Things (CIoT_EC_GSM)", GERAN #67, Ericsson LM, Intel, Gemalto N.V., MediaTek Inc., TeliaSonera AB, Sierra Wireless, S.A., Telit Communications S.p.A., ORANGE, Nokia Networks, Alcatel Lucent. The objective of the EC-GSM work item is to introduce the EC-GSM-IoT feature in the 3GPP technical specifications.

EC-GSM-IoT has previously been named, or referred to as, EC-GSM and even EC-EGPRS.

Requirements for EC-GSM-IoT may be considered characterized by long radio coverage range, long battery life, low complexity as well as short data transfers. For example, an intention has been to improve coverage with 20 dB, to improve battery life time (i.e. be more energy efficient), keeping a minimum bitrate and to decrease device complexity. On the control channels the coverage is to be improved by for example using blind physical layer transmissions of radio blocks while on the data channels the coverage is improved using a combination of blind physical layer transmissions and HARQ retransmissions of radio blocks.

It was e.g. part of said WI to standardize a set of new logical channel supporting operation in an extended coverage range. These channels are known as EC-channels. It was also part of the WI to introduce a new and simplified protocol stack associated with these logical channels.

SUMMARY

It is an object to alleviate or at least reduce one or more problems indicated herein. Hence, an object is to provide one or more improvements in a wireless communication network, and in particular that facilitate deployment of EC-GSM-IoT.

According to a first aspect of embodiments herein, the object is achieved by a method, performed by a wireless device operative in a wireless communication network, for managing downlink signal information. The downlink signal information is information about signal quality and/or signal strength received by the wireless device in a downlink. The wireless device obtains the downlink signal information. The wireless device sends, to the wireless communication network, a message indicating said obtained downlink signal information and which message is associated with the wireless device requesting access to the wireless communication network. The obtained downlink information is indicated in the message by a range that indicates how much the obtained downlink signal information exceeds a certain threshold. The range is determined based on a certain factor. The wireless device has received information about said certain factor from the wireless communication network.

According to a second aspect of embodiments herein, the object is achieved by a computer program comprising instructions that when executed by a wireless device causes the wireless device to perform the method according to the first aspect.

According to a third aspect of embodiments herein, the object is achieved by a computer readable medium comprising the computer program according to the second aspect.

According to a fourth aspect of embodiments herein, the object is achieved by a second method, performed by a wireless communication network for managing downlink signal information. The downlink signal information is information about signal quality and/or signal strength received in a downlink by a wireless device operative in the wireless communication network. The wireless communication network receives, from the wireless device, a message indicating said downlink signal information and which message is associated with the wireless device requesting access to the wireless communication network. The downlink signal information is indicated in the message by a range that indicates how much the downlink signal information exceeds a certain threshold. The range is determined based on a certain factor that the wireless communication network has sent information about to the wireless device (120).

According to a fifth aspect of embodiments herein, the object is achieved by a computer program comprising instructions that when executed by a network node comprised in a wireless communication network causes the wireless communication network to perform the method according to the fourth aspect.

According to a sixth aspect of embodiments herein, the object is achieved by a computer readable medium comprising the computer program according to the fifth aspect.

According to a seventh aspect of embodiments herein, the object is achieved by a wireless device for managing downlink signal information. The wireless device is configured to be operative in a wireless communication network. The downlink signal information is information about signal quality and/or signal strength received by the wireless device in a downlink. The wireless device is configured to obtain the downlink signal information. Further, the wireless device is configured to send, to the wireless communication network, a message indicating said obtained downlink signal information and which message is associated with the wireless device requesting access to the wireless communication network. The obtained downlink information is indicated in the message by a range that indicates how much the obtained downlink signal information exceeds a certain threshold. The range is determined based on a certain factor that the wireless device has received information about from the wireless communication network.

According to an eighth aspect of embodiments herein, the object is achieved by a wireless communication network for managing downlink signal information. The downlink signal information is information about signal quality and/or signal strength received in a downlink by a wireless device operative in the wireless communication network. The wireless communication network is configured to receive, from the wireless device, a message indicating said downlink signal information and which message is associated with the wireless device requesting access to the wireless communication network. The downlink signal information is indicated in the message by a range that indicates how much the downlink signal information exceeds a certain threshold. The range is determined based on a certain factor that the wireless communication network has sent information about to the wireless device.

Thanks to said message, e.g a Random Access CHannel (RACH) request message, such as the EC-GSM-IoT Packet Channel Request message, the wireless device, e.g. a GSM MS operating according to EC-GSM-IoT, is able to in a flexible way provide an early indication, e.g. as part of a system access request sent on the RACH, of its current received DL signal quality and/or strength to the wireless communication network, e.g. the network node, such as a Base Station Subsystem (BSS). This even in the case of normal coverage and when a coverage class CC1 is used in EC-GSM-IoT.

This facilitates counteracting increased interference levels, as indicated as a concern above, and facilitates optimized spectral efficiency when the wireless communication network is supporting EC-GSM-IoT despite an else limited ability for a BSS to then adapt Modulation and Coding Schemes (MCS) and power levels during the life time of a Temporary Block Flow (TBF). Hence, embodiments herein, and as described above, provide one or more improvements that facilitate deployment of EC-GSM-IoT.

BRIEF DESCRIPTION OF THE DRAWINGS

The various aspects of embodiments disclosed herein, including particular features and advantages thereof, will be readily understood from the following detailed description and the accompanying drawings, in which FIGS. 1-7 are shown.

FIG. 1 is a block diagram schematically depicting an example of a wireless communication network in which embodiments herein may be implemented.

FIG. 2 is a combined signaling diagram and flowchart for describing some embodiments herein.

FIG. 3 is a flowchart schematically illustrating embodiments of a first method according to embodiments herein.

FIG. 4 is a functional block diagram for illustrating embodiments of a device according to embodiments herein and how it can be configured to carry out the first method.

FIG. 5 is a flowchart schematically illustrating embodiments of a second method according to embodiments herein.

FIG. 6 is a functional block diagram for illustrating embodiments of a network node according to embodiments herein and how it can be configured to carry out the second method.

DETAILED DESCRIPTION

Figure 1:
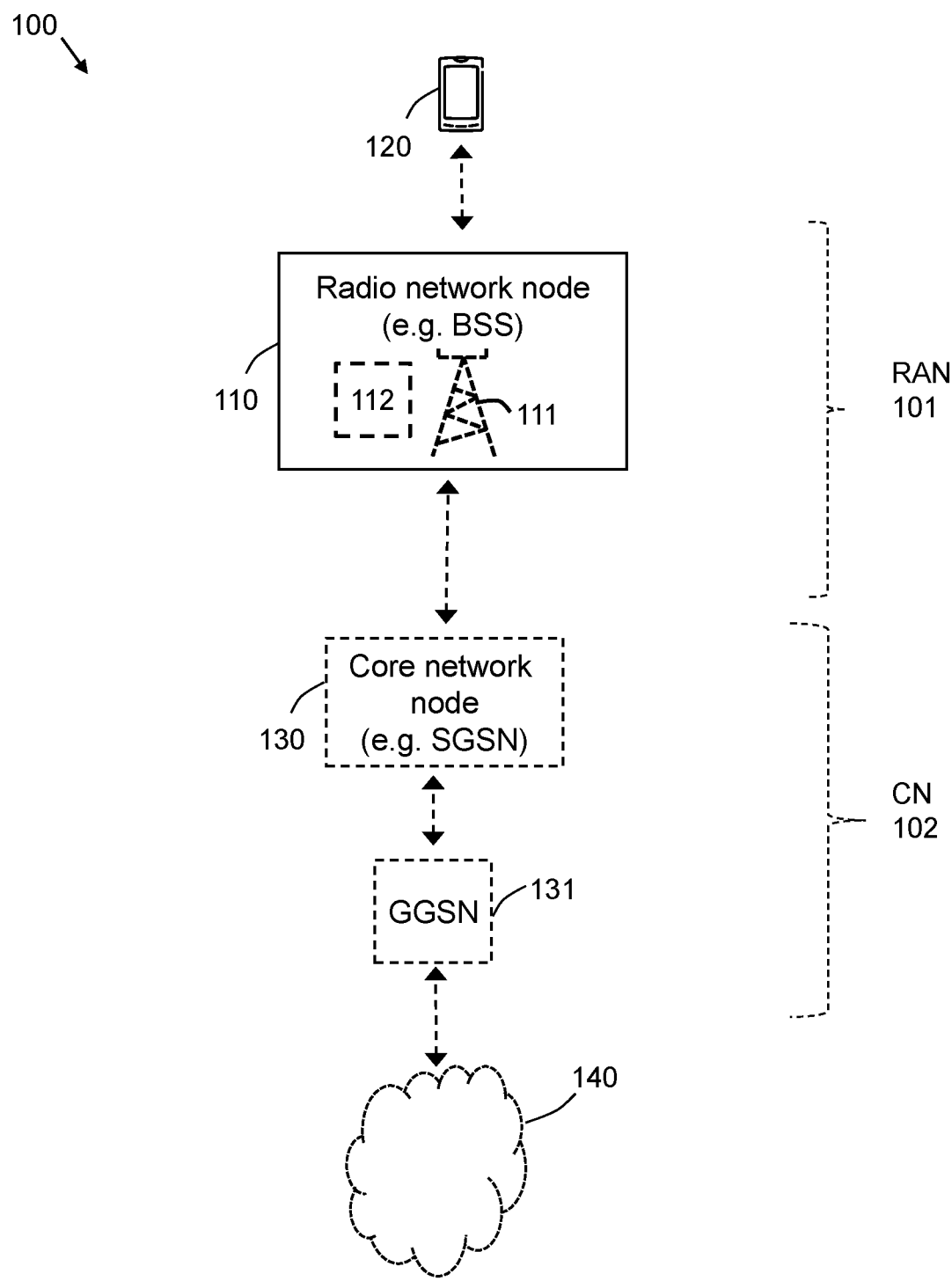

Throughout the following description, similar reference numerals have been used to denote similar elements, units, modules, circuits, nodes, parts, items or features, when applicable. In the figures, features that appear only in some embodiments are typically indicated by dashed lines. Moreover, in the following, embodiments herein are illustrated by exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

As a development towards embodiments herein, problems generally indicated in the Background will first be further elaborated upon.

During work related to the WI referred to in the Background, it was proposed to specify a EC-EGPRS, i.e. EC-GSM-IoT, Packet Channel Request message sent over an Extended Coverage Random Access Channel (EC-RACH) to initiate a data transfer and ask for a data connection. See e.g. GP-151111, "Introduction of EC-EGPRS and PEO into TS 44.018", GERAN #68. The message is exemplified in Table 1.

TABLE 1

| EC-EGPRS Packet Channel Request message content |
|---|
| < EC-EGPRS Packet channel request message content > ::= <br>     < EC-NumberOfBlocks : bit (4) > <br>     < EC-EGPRS Priority : bit (1) > <br>     < RandomBits : bit (3) > <br>     < DL Coverage Class : bit (2) > <br>     < Spare : bit (1) >; |

As part of the EC-EGPRS Packet Channel Request message above, the two bit DL Coverage Class (CC) Information Element (IE) was intended to signal the DL CC assumed by the MS based on its estimated downlink (DL) signal strength, or signal quality, and a set of CC thresholds broadcasted by the network over the EC-System Information (EC-SI). More specifically the CC thresholds should indicate to a MS which coverage class to use for UL transmissions, and which DL coverage class to recommend the network to use, provided a certain measurement by the MS on the cell it is camping on.

A purpose with EC-GSM-IoT has been to cater for devices expected to make use of data transfers, or in other words Temporary Block Flows (TBFs), as short as a few radio blocks. A EC-GSM-IoT network, i.e. a wireless communication network operating according to EC-GSM-IoT, will hence have a limited ability to adapt Modulation and Coding Schemes (MCS) as well as used power levels during the life time of a TBF. EC-GSM-IoT is also intended to support massive number of devices. In e.g. 3GPP TR 45.820 V13.0.0, a target of 50 000 devices supported per cell is seen as being realistic. The combination of a limited ability to adapt used power levels and massive number of devices may lead to high interference levels in EC-GSM-IoT networks.

It is further so that EC-GSM-IoT capable devices as well as base stations are expected to operate at extremely low signal levels in order to support operation in extended coverage range. This will make them vulnerable to interference.

If a MS could provide an early indication, e.g. as part of the system access request sent on a random access channel, of its current received DL signal quality, or strength, to the BSS, then this information could be used by the BSS to e.g. optimize the initial UL/DL Modulation and Coding Scheme (MCS) selection, EC-PDTCH resource assignment as well as selection and assignment of initial UL/DL power levels. This would counteract the concern over interference levels mentioned above and facilitate optimized spectral efficiency in an EC-GSM-IoT network despite the limited ability of the BSS to adapt MCS and power levels during the life time of a TBF. It is thus clearly so that this idea, that embodiments herein are at least partly based on, would result in an improvement that facilitates deployment of EC-GSM-IoT.

Embodiments herein and how they may be implemented will now be described in further detail.

FIG. 1 is a schematic block diagram schematically depicting an example of a wireless communication network 100 in which embodiments herein may be implemented. The wireless communication network 100 is typically a telecommunication network or system, such as a cellular communication network that may be a GSM network or a wireless communication network that supports GSM, and preferably EC-GSM-IoT, i.e. such network as indicated elsewhere herein as relevant for embodiments of the present disclosure. The wireless communication network may comprise a RAN 101 part and a core network (CN) 102 part.

A radio network node 110 is shown comprised in the wireless communication network 100 and in the RAN 101. The radio network node 110 may be a radio network node as illustrated in the figure and may be or be comprised in a Base Station Subsystem (BSS), e.g. such supporting GSM/EDGE, for example when the when the wireless communication network 100 is a GSM network or a GSM based communication network, e.g. supporting EC-GSM-IoT. The radio network node 110 may be or comprise a base station 111, e.g. a Base Transceiver Station (BTS) of said BSS. The radio network node 110 may further comprise a controlling node 112 of a base station, which may control one or more base stations, including e.g. the base station 111, and may be a Base Station Controller (BSC) of said BSS.

The radio network node 110, or another network node, may serve and/or control and/or manage one or more devices, typically wireless devices, e.g. MSs, such as a wireless device 120 shown in the figure, which are supported by and/or operative in the wireless communication network 100. The wireless device 120 may be of any type discussed herein, but is typically a MTC device and/or one that support EC-GSM-IoT and/or operate according to EC-GSM-IoT.

Further, a core network node 130 may be comprised in the wireless communication network 100 and in the CN 101. The first core network node 130 may be a SGSN when the wireless communication network 100 is a GSM network or a GSM based communication network.

The wireless device 120 may communicate with and/or via the first core network node over a radio network node, e.g. the network node 110. The CN 102 may provide access for the wireless device to an external network 140, e.g. the Internet. The wireless device 120 may thus communicate via the RAN 101 and the CN 102 with the external network 140. When the wireless communication network 100 is a GSM network or a GSM based communication network, such as one supporting EC-GSM-IoT, the access to the external network is typically via a Gateway GPRS Support Node (GGSN), such as the GGSN 131 illustrated in the figure.

The wireless communication network 100, including relevant nodes thereof, e.g. the radio network node 110, and the wireless device 120, typically support, and/or are configured to operate according to EC-GSM-IoT. The wireless communication network then typically supports Coverage Classes (CCs), such as defined for EC-GSM-IoT. The CCs are associated with different radio coverage levels, such as different coverage extension, respectively.

However, as used herein, "coverage class", or simply "CC", at least if not in the context of EC-GSM-IoT, may more generally refer to an ability of a device, e.g. the wireless device 120, to communicate with the wireless communication network 100 from a certain location and/or under certain conditions. Devices that are assigned and thereby operate according to different CCs typically have different ability to communicate with the wireless communication network although located at the same location. For example, a CC associated with a device typically determines a number of so called blind repetitions to be used in communication with the device. A worse coverage typically requires more such repetitions and thereby a higher CC.

The wireless device 120 may be associated with, e.g. support or operate according to, one or more, typically one, or at least one at a time in the uplink and/or downlink, of said coverage classes that the wireless communication network 100 supports.

Coverage classes of the downlink and uplink may not need to be the same, i.e. may be different.

Attention is drawn to that FIG. 1 is only schematic and for exemplifying purpose and that not everything shown in the figure may be required for all embodiments herein, as should be evident to the skilled person. Also, a wireless communication network or networks that in reality correspond(s) to the wireless communication network 100 will typically comprise several further network nodes, such as base stations, etc., as realized by the skilled person, but which are not shown herein for the sake of simplifying.

Figure 2:
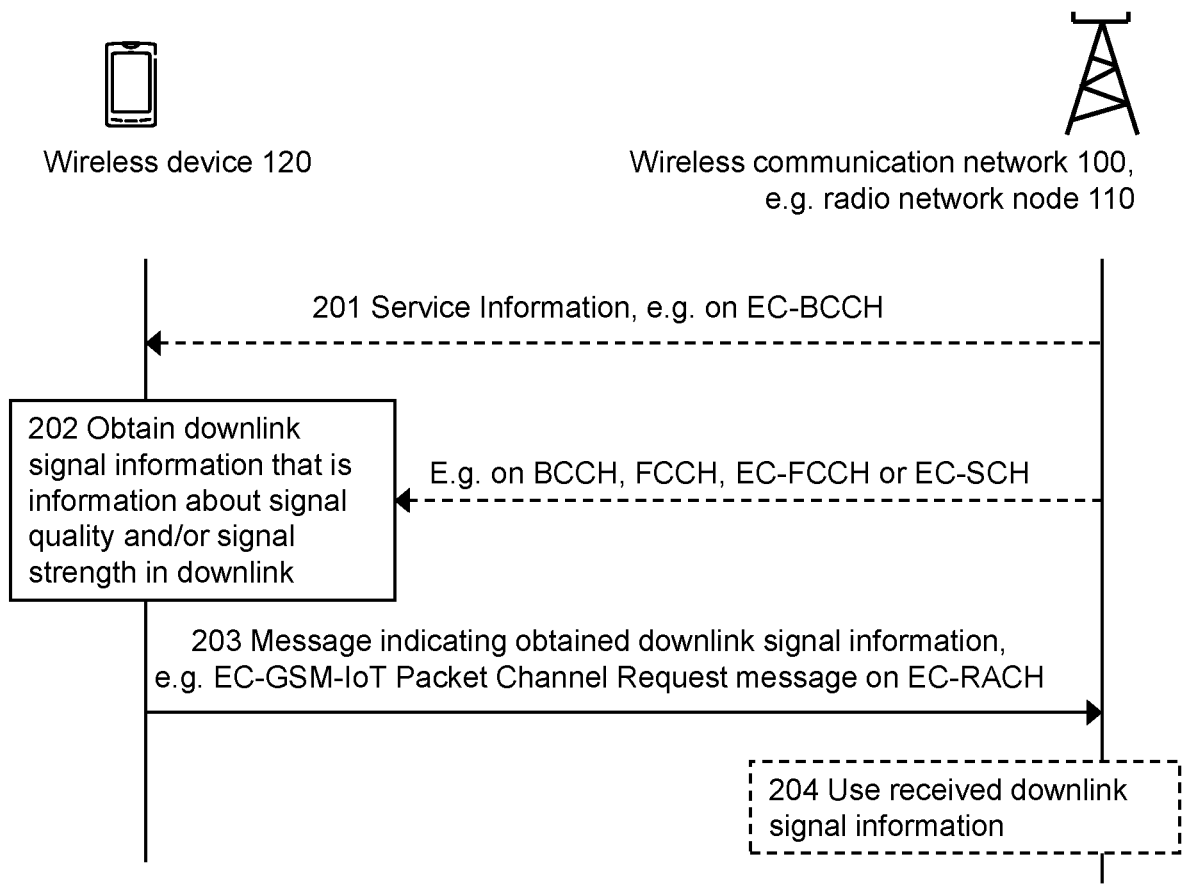

FIG. 2 depicts a combined signaling diagram and flowchart, which will be used to discuss embodiments herein. The involved nodes, as shown in the figure is the wireless device 120, and the a wireless communication network 100, that may be exemplified by the radio network node 110, at least in some embodiments. The wireless communication device 120 is in the following actions an example of a device performing said actions.

The methods and actions discussed in the following are for managing downlink signal information, which downlink signal information is information about downlink, i.e. received, signal quality and/or signal strength, i.e. in a wireless downlink.

The below actions may be taken in any suitable order and/or be carried out fully or partly overlapping in time when this is possible and suitable.

Action 201

The wireless communication network 100 may send and the wireless device 120 may receive System Information (SI) from the wireless communication network 100. The SI may be broadcasted by wireless communication network 100 over the Extended Coverage BroadCastCHannel (EC-BCCH). In some embodiments the SI comprises information about a threshold and/or a factor "X", which are further discussed and explained below, e.g. under Action 203.

Action 202

The wireless device 120 obtains the downlink signal information, that is, as mentioned above, information about downlink, i.e. received, signal quality and/or signal strength.

This information may be obtained in a conventional manner, e.g. measured on a wireless signal by the wireless device 120, e.g. as in GSM or EC-GSM-IoT. The downlink signal quality and/or signal strength may have been measured on any conventional downlink signal suitable for measuring downlink signal quality and/or signal strength, e.g., as indicated in FIG. 2, on the BroadCast CHannel (BCCH) carrier in GSM, the Extended Coverage BCCH (EC-BCCH), or e.g. on a Frequency Correction Channel (FCCH), such as a Extended Coverage Frequency Correction Channel (EC-FCCH) or an Extended Coverage Synchronization Channel (EC-SCH).

The downlink signal information may e.g. correspond to a signal level metric, a quality metric and/or a gain metric, e.g. wanted signal power, Signal to Interference and Noise Ratio (SINR) and/or Coupling Loss (CL) between a serving base station, such as the radio network node 110 or BTS thereof, and the wireless device 120.

Action 203

The wireless device 120 sends, to the wireless communication network 100, e.g. the radio network node 110, a message indicating the downlink signal information obtained in Action 202. The wireless communication network 100, e.g. the radio network node 110, receives the message.

The message may be sent, and/or received, in response to that the wireless device 120 is in normal coverage and/or to inform the wireless communication network 100 about this, e.g. that the wireless device 120 is in a normal coverage mode, in the downlink (DL), and/or e.g. is associated with a CC indicating normal coverage, e.g. DL CC1.

The message is typically a message that is sent for, or associated with, requesting access to the wireless communication network by the device, e.g. in order to initiate a data transfer and/or ask for a connection for communication with the wireless communication network, typically uplink data transfer. The message is typically sent and/or received over a Random Access CHannel (RACH) of the wireless communication network. The message may be specific for EC-GSM-IoT and may be sent and/or received over a RACH associated with, e.g. used and/or specific for EC-GSM-IoT. The message may thus be a RACH request message, e.g. a EC-GSM-IoT Packet Channel Request message and may be sent and/or received over an Extended Coverage RACH (EC-RACH) as exemplified in the figure.

Said obtained downlink signal information may be indicated in said message by indicating it relative to a certain threshold, e.g. by indicating a margin between the obtained downlink signal information, i.e. received signal quality and/or signal strength, and the certain threshold, e.g. so that the margin indicates how much the received signal quality and/or signal strength exceeds the threshold. Information about the threshold may have been received from the wireless communication network 100 previously, e.g. as part of System Information (SI), e.g. broadcasted over the Extended Coverage BCCH (EC-BCCH), such as in Action 201. The threshold may be relevant for a certain operation of the device. The threshold may e.g. be associated with a certain CC that the device is associated with, e.g. operating according to, in particular in the downlink (DL). Said certain threshold may e.g. be associated with a DL coverage class CC1 when the message is said EC-GSM-IoT Packet Channel Request message.

The margin may be indicated in the form of a range or interval and/or be indicated relative to a certain factor. The factor may be named "X" elsewhere in the present disclosure. For example, the margin may be indicated as "less than X dB", "between X and 2X dB" etc. The factor X may by predetermined and/or predefined in e.g. a technical specification, and/or be configurable by the wireless communication network and/or an operator thereof. For example, said factor may represent a margin between said certain threshold, e.g. a DL CC1 threshold, and the received signal quality and/or signal strength. The factor X may have been e.g. broadcasted over an Extended Coverage BCCH (EC-BCCH) and/or been received as part of SI from the wireless communication network, such as in Action 201.

The threshold, the margin and the factor X are further discussed and exemplified below.

Said message may, in addition to indicating said obtained downlink signal information, also indicate a DL CC associated with the device. The indication of the obtained downlink signal information, i.e. received signal quality and/or signal strength, and the DL CC may be combined in a single indication, e.g. in the form of a specific information element (IE) that may be named a DL CC and Signal Quality IE, and may be encoded in one and the same code word, that may be named code point elsewhere herein, such as in a 3 bit code, comprised in said message. That is, said IE may be 3 bits and may e.g. replace a prior art DL CC IE of 2 bits and a spare bit of 1 bit in a prior art EC-GSM-IoT Packet channel request message, such as shown in Table 1, thereby forming a new EC-GSM-IoT Packet channel request message.

Said single indication may thus be signaled using a predetermined number of bits in said message.

A definition or meaning of different coding of the indication, such as meaning or definition of different code points or values of said predetermined number of bits, may be predetermined and/or predefined, e.g. in a technical specification, and/or by the wireless communication network and/or an operator thereof.

There may be different definition or meaning depending on a number of supported DL CCs, For example, there may be a predetermined and/or predefined set of definitions or meanings, e.g. in the form of different tables, and which one that is valid or applicable is determined by the number of supported CCs.

The indication of DL CC is further discussed and exemplified below.

A Training Sequence Code (TSC) used in a RACH, e.g. EC-RACH, carrying said message may be defined uniquely for a certain UL CC. A received TSC may hence allow a receiving network node to distinguish the UL CC of the wireless device 120. In some embodiments said message may therefore be defined differently depending on which UL CC and/or TSC is being used by the wireless device 120. For example one or more indications of the obtained downlink signal information, i.e. received signal quality and/or signal strength, and/or of the DL CC may be defined differently depending on the UL CC being used by the wireless device 120. E.g. the number of bits being used for encoding said one or more indications, e.g. said single, i.e. common indication, or separate ones, may be different depending on the UL CC. In some cases there may be a strong coupling between the UL and DL CC of a device and depending on the UL CC there may be no need to indicate DL CC at all in the message. This information may instead be implicitly conveyed by the choice of UL CC, typically EC-RACH TSC. More bits in said message may be then used for indicating the received signal quality and/or signal strength, which e.g. enable a finer resolution.

The TSC is further discussed and exemplified below.

Action 204

The wireless communication network 100 may then use the downlink signal information indicated in the message received in Action 203, for example for one or more of the following purposes:

optimizing initial DL and/or UL modulation for the wireless communication device 120, and/or selecting modulation and/or coding scheme for the wireless communication device 120, and/or assigning resources to the wireless communication device 120, typically on a Packet Data Traffic Channel (PDTCH), such as a PDTCH used for and/or specific for EC-GSM-IoT, e.g. a EC-PDTCH, and/or selecting and/or assigning initial DL and/or UL power levels for the wireless communication device 120.

Thanks to said message, in particular when it is a RACH request message, such as the EC-GSM-IoT Packet Channel Request message, the device, e.g. a GSM MS operating according to EC-GSM-IoT, is able to provide an early indication, e.g. as part of a system access request sent on the RACH, of its current received DL signal quality and/or strength to the wireless communication network 100, e.g. BSS of the radio network node 110. This facilitates counteracting increased interference levels, as indicated as a concern above, and facilitates optimized spectral efficiency when the wireless communication network 100 is supporting EC-GSM-IoT despite a limited ability for a BSS to then adapt MCS and power levels during the life time of a TBF. Hence, embodiments herein, and as described above, provide one or more improvements that facilitate deployment of EC-GSM-IoT.

Some embodiments will now be discussed in some further detail, and will e.g. contain examples of the CC indication, threshold, margin and factor X mentioned above.

In some embodiments, to facilitate early signaling of received DL signal quality/strength for devices in normal coverage, i.e. in coverage class CC1, a EC-GSM-IoT Packet Channel Request DL CC IE, as shown in Table 1 above, is combined with the spare bit to create a 3 bit DL CC and Signal Quality IE. In addition to the DL CC, this IE may signal a margin between the received signal quality and/or strength and the DL CC1 threshold. This may identify how much the received signal quality and/or strength that the device estimates exceeds the threshold for CC1 operation identified by system information. The code points in the IE shown in Table 1 may be maximally utilized if made dependent on the number of CCs supported and signaled by the wireless communication network 100. Table 2, Table 3 and Table 4 below presents example definitions for the DL CC and Signal Quality IE for wireless communication networks signaling support for four, three or two CCs. In the tables it has been assumed that the CC thresholds are defined in terms of DL received signal strength, and that X represents a power margin, or factor, that should be compared to the difference in DL CC1 signal strength threshold and the actual received DL signal strength; DL received signal strength—DL CC1 threshold.

TABLE 2

Example of DL CC and Signal Level IE definition in case of four supported CCs.

| Code point | DL CC | DL received power relative the CC1 threshold |
| --- | --- | --- |
| 000 | 4 | — |
| 001 | 3 | — |
| 010 | 2 | — |
| 011 | 1 | <X dB |
| 100 | 1 | X-2X dB |
| 101 | 1 | 2X-3X dB |
| 110 | 1 | 3X-4X dB |
| 111 | 1 | ≥4X dB |

TABLE 3

Example of DL CC and Signal Level IE definition in case of three supported CCs.

| Code point | DL CC | DL received power relative the CC1 threshold |
| --- | --- | --- |
| 000 | 4 | — |
| 001 | 2 or 3 | — |
| 010 | 1 | <X dB |
| 011 | 1 | X-2X dB |
| 100 | 1 | 2X-3X dB |
| 101 | 1 | 3X-4X dB |
| 110 | 1 | 4X-5X dB |
| 111 | 1 | ≥5X dB |

TABLE 4

Example of DL CC and Signal Level IE definition in case of two supported CCs.

| Code point | DL CC | DL received power relative the CC1 threshold |
| --- | --- | --- |
| 000 | 4 | — |
| 001 | 1 | <X dB |
| 010 | 1 | X-2X dB |
| 011 | 1 | 2X-3X dB |
| 100 | 1 | 3X-4X dB |
| 101 | 1 | 4X-5X dB |
| 110 | 1 | 5X-6X dB |
| 111 | 1 | ≥6X dB |

Since the characteristics, or statistics, of the received signal strength is expected to be varying between as well as within networks it may be suitable to signal the power margin, or factor X, in an EC-SI message, i.e. a system information message for, or that is specific for, EC-GSM-IoT, so that wireless communication network vendors may optimize the above signaling in accordance to actual wireless communication network conditions. However, in some embodiments the margin or factor X may be predetermined and/or set to a fixed margin and e.g. be determined by a technical specification.

The DL CC threshold definition and the factor X may equally well be defined by a quality metric, such as Signal to Interference and Noise Ratio (SINR), or by a gain metric, such as coupling loss (CL) between serving base station and the device.

Considering that in EC-GSM-IoT different training sequences may be used depending on the UL coverage class used by an MS, e.g. the wireless device 120, and based on the fact that the wireless communication network 100 may need to identify the UL coverage class, the content of the EC-GSM-IoT Packet Channel Request may be defined differently depending on the UL coverage class indicated. If the BTS, e.g. a BTS corresponding to the base station 111 of the radio network node 110, output power is known, the wireless device 120 output power is known, the estimated path loss is known, and the coverage class thresholds are known, different contents of the EC-GSM-IoT Packet Channel Request may be useful. For example, if the UL coverage class corresponds to normal coverage, thus typically 1, and the base station 111 output power exceeds that of the wireless device 120, it could be assumed that the only coverage class of interest for the DL would also be coverage class 1, and hence all eight code points in the above tables could be used to indicate different power levels above the CC1 threshold. How to determine the content of the three bits, would however only work under the specification of a certain set of rules on how to derive the content, but as realized, it may be used to expand the information that could be signaled compared to having a fix definition of the code points, irrespective of UL coverage class that e.g. may be selected.

To illustrate the above in a specific example. Assume for example that the following is known to an MS, e.g. the wireless device 120 and a BTS, e.g. the base station 111, e.g. from a broadcast of system information: That the base station 111 output power e.g. on EC-SCH is 43 dBm and a max wireless device 120 output power e.g. on EC-RACH is 33 dBm. That the DL CC1 threshold is −105 dBm and the UL CC1 threshold is −113 dBm. Then the use of CC1 in the UL implies that the estimated UL received signal strength is larger than −113 dBm, which in turn implies that the measured downlink signal strength is larger than −113+(43−33)=−103 dBm. Since this is above the DL CC1 threshold, no code points for DL CC2 or higher are needed in the EC-GSM-IoT packet channel request message.

In general, if UL coverage class X is used, and (UL CC threshold X)+(base station output power)−(max wireless device output power)>(DL CC threshold Y), then no code points are needed for DL coverage class Y+1 and higher in the EC-GSM-IoT packet channel request message.

Embodiments herein, as e.g. discussed above, support the wireless communication network 100, e.g. the radio network node 111 thereof, such as a BSS, to do e.g. one or more of the following:

Make a sophisticated assumption of the initial MCS to be used in a DL TBF or assigned to an UL TBF via EC-GSM-IoT Fixed Uplink Allocation IE, see e.g. GP-151111, "Introduction of EC-GSM-IoT and PEO into TS 44.018", GERAN #68. Given the short TBF length expected for cellular IoT devices it will be important to be able to make an accurate initial MCS selection to optimize spectral efficiency.

Set initial downlink power level and uplink power level on the assigned EC-PDTCH resources to a level optimizing throughput for the selected MCS and thereby minimize interference levels in the EC-GSM-IoT network. For downlink power level see e.g. PR_MODE and P0 IEs in GP-151111, "Introduction of EC-GSM and PEO into TS 44.018", GERAN #68 and in GP-151112, "Introduction of system information for EC-GSM into TS 44.018", GERAN #68. For uplink power level see e.g. GAMMA IE in GP-151112, "Introduction of system information for EC-GSM into TS 44.018", GERAN #68. Again the initial assumption is important due to the short time duration expected for many TBFs.

Support power regulation of the EC-AGCH when an EC-PDTCH resource assignment message after receiving a system access request on the EC-RACH. See e.g. sending of EC-Immediate Assignment Type 2 message in GP-151111, "Introduction of EC-GSM and PEO into TS 44.018", GERAN #68. This will allow for a safe down regulation of the power level used by the network when sending an EC-PDTCH resource assignment message on the EC-AGCH, when addressing devices in DL CC1. As mentioned for the EC-PDTCH this would reduce interference levels in the network which is especially important for EC-GSM-IoT with support for extended range operation.

Figure 3:
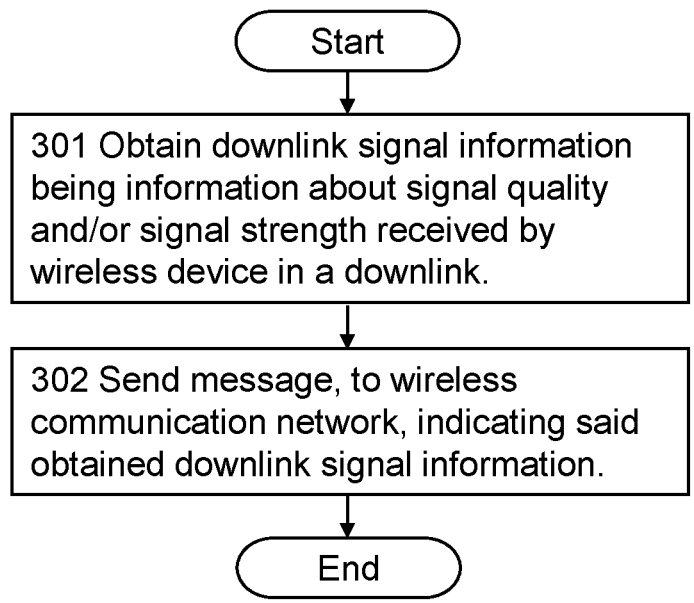

FIG. 3 is a flow chart schematically illustrating embodiments of a first method, performed by a wireless device, exemplified by the wireless device 120 in the following, operative in a wireless communication network, e.g. the wireless communication network 100. The wireless communication network 100 is preferably a GSM network that supports EC-GSM-IoT. The first method is for managing downlink signal information, the downlink signal information being information about signal quality and/or signal strength received by the wireless device 120 in a downlink.

The first method comprises the following actions, which actions may be taken in any suitable order and/or be carried out fully or partly overlapping in time when this is possible and suitable.

Action 301

The wireless device 120 obtains the downlink signal information.

This action may fully or partly correspond to Action 202 as described above.

Action 302

The wireless device 120 sends, to the wireless communication network 100, a message indicating said obtained downlink signal information and which message is associated with the wireless device 120 requesting access to the wireless communication network 100. The obtained downlink information is indicated in the message by a range, that may correspond to a margin, and that indicates how much the obtained downlink signal information exceeds a certain threshold. As should be realized, in practice when a value represents said downlink signal information and indicates said received signal quality and/or signal strength, the range may indicate how much this value exceeds said certain threshold. The range is determined based on a certain factor, such as the factor "X" mentioned elsewhere herein. The wireless device 120 has previously received information about said certain factor from the wireless communication network 100, typically as part of SI.

The wireless device 120 may also have received information about said certain threshold from the wireless communication network 100, also typically as part of SI.

Further, said certain threshold may be associated with a certain radio coverage level, e.g. certain coverage class, or CC, associated with the wireless device 120. In case of EC-GSM-IoTm the certain CC is preferably a CC, such as CC1, indicating that the wireless device 120 is in a normal coverage.

Said message may also indicate said certain radio coverage level. The indication about the downlink signal information and said certain radio coverage level may be encoded in one and the same code word comprised in said message.

This action may fully or partly correspond to Action 203 as described above.

Figure 4:
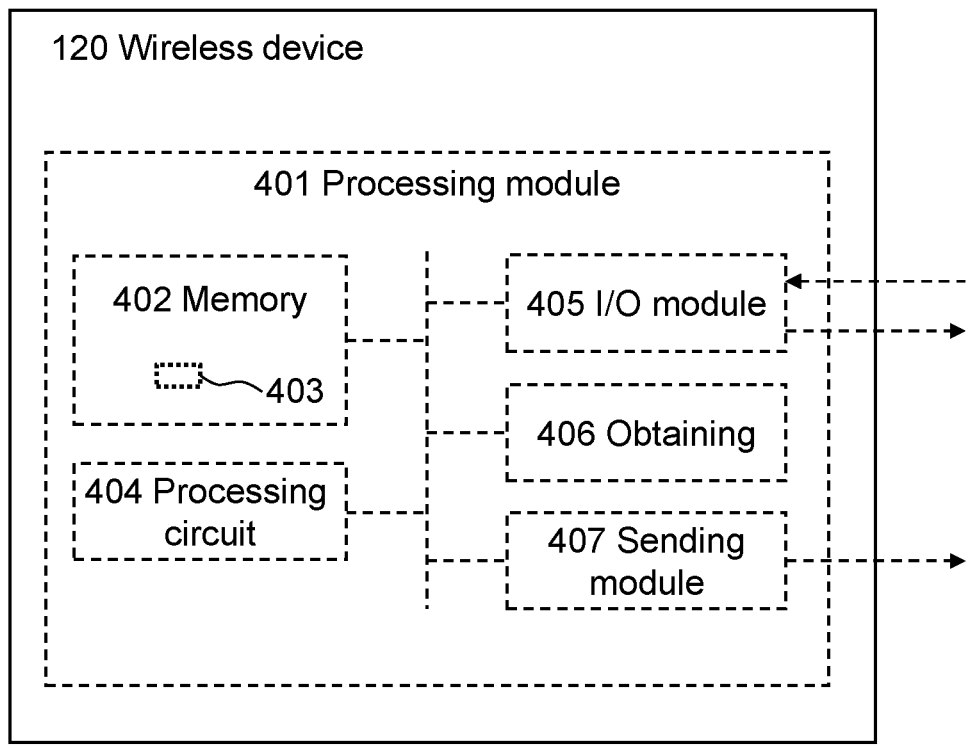

FIG. 4 is a schematic block diagram for illustrating embodiments of the wireless device 120, and how it may be configured to perform the first method and/or actions discussed above. Hence, the wireless device 120 may comprise one or more of the following:

A processing module 401, such as a means, one or more hardware modules, including e.g. one or more processors, and/or one or more software modules for performing said method and/or actions.

A memory 402, which may comprise, such as contain or store, a computer program 403. The computer program 403 comprises 'instructions' or 'code' directly or indirectly executable by the wireless device 120 so that it performs said method and/or actions. The memory 402 may comprise one or more memory units and may be further be arranged to store data, such as configurations and/or applications involved in or for performing functions and actions of embodiments herein.

A processing circuit 404 as an exemplifying hardware module and may comprise or correspond to one or more processors. In some embodiments, the processing module 401 may comprise, e.g. is embodied in the form of or 'realized by' the processing circuit 404. In these embodiments, the memory 402 may comprise the computer program 403 executable by the processing circuit 404, whereby the wireless device 120 comprising it is operative, or configured, to perform said method and/or actions.

An Input/Output (I/O) module 405, configured to be involved in, e.g. by performing, any communication to and/or from other units and/or nodes, such as sending and/or receiving information to and/or from other external nodes or devices. The I/O module 405 may be exemplified by an obtaining, e.g. receiving, module and/or a sending module, when applicable.

The wireless device 120 may also comprise other exemplifying hardware and/or software module(s) as may have been described elsewhere in the present disclosure, which module(s) may be fully or partly implemented by the respective processing circuit. For example, the wireless device 120 may further comprise an obtaining module 406 and/or a sending module 407.

The wireless device 120 and/or the processing module 401 and/or the processing circuit 404 and/or the I/O module 405 and/or the obtaining module 406 are operative, or configured, to obtain the downlink signal information.

The wireless device 120 and/or the processing module 401 and/or the processing circuit 404 and/or the I/O module 405 and/or the sending module 407 are operative, or configured, send, to the wireless communication network 100, said message indicating said obtained downlink signal information and which message is associated with the wireless device 120 requesting access to the wireless communication network 100.

The wireless device 120 may also be configured to receive information about said certain threshold and/or said certain factor, from the wireless communication network 100, typically as part of SI.

Figure 5:
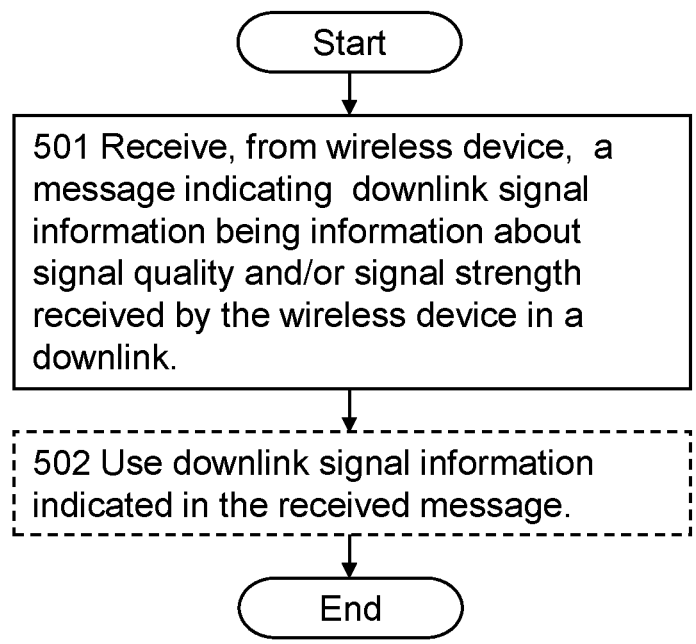

FIG. 5 is a flow chart schematically illustrating embodiments of a second method, performed by a wireless communication network, exemplified by the wireless communication network 100 in the following. The second method is for managing downlink signal information, the downlink signal information being information about signal quality and/or signal strength received in a downlink by a wireless device 120 operative in the wireless communication network 100. The wireless communication network 100 is preferably a GSM network that supports EC-GSM-IoT. In some embodiments, the second method is performed by a network node, e.g. the radio network node 110, comprised in the wireless communication network 100.

The second method comprises the following actions, which actions may be taken in any suitable order and/or be carried out fully or partly overlapping in time when this is possible and suitable.

Action 501

The wireless communication network 100 receives, from the wireless device 120, a message indicating said downlink signal information and which message is associated with the wireless device 120 requesting access to the wireless communication network 100. The downlink signal information is indicated in the message by a range that indicates how much the downlink signal information exceeds a certain threshold. A value may represent said downlink signal information and indicate said received signal quality and/or signal strength, and the range may thus indicate how much this value exceeds said certain threshold. The range is determined based on a certain factor, such as the factor "X" mentioned elsewhere herein. The wireless communication network 100 have previously sent information about said certain factor to the wireless device 120, typically as part of SI.

The wireless communication network 100 may also have sent information about said certain threshold to the wireless device 120, also typically as part of SI.

Further, said certain threshold may be associated with a certain radio coverage level, e.g. coverage class, associated with the wireless device 120. In case of EC-GSM-IoT and the certain radio coverage being a certain CC, the certain CC is preferably a CC, such as CC1, indicating that the wireless device 120 is in a normal coverage.

Said message may also indicate said certain radio coverage level. The indication about the downlink signal information and said certain radio coverage level may be encoded in one and the same code word comprised in said message.

This action may fully or partly correspond to Action 203 as described above.

Action 502

The wireless communication network 100 may then use the downlink signal information indicated in the received message for one or more of the following purposes:

optimizing an initial downlink and/or uplink modulation for the wireless device 120, and/or selecting modulation and/or coding scheme for the wireless device 120, and/or assigning resources to the wireless device 120, and/or selecting and/or assigning downlink and/or uplink power levels for the wireless device 120.

This action may fully or partly correspond to Action 204 as described above.

Figure 6:
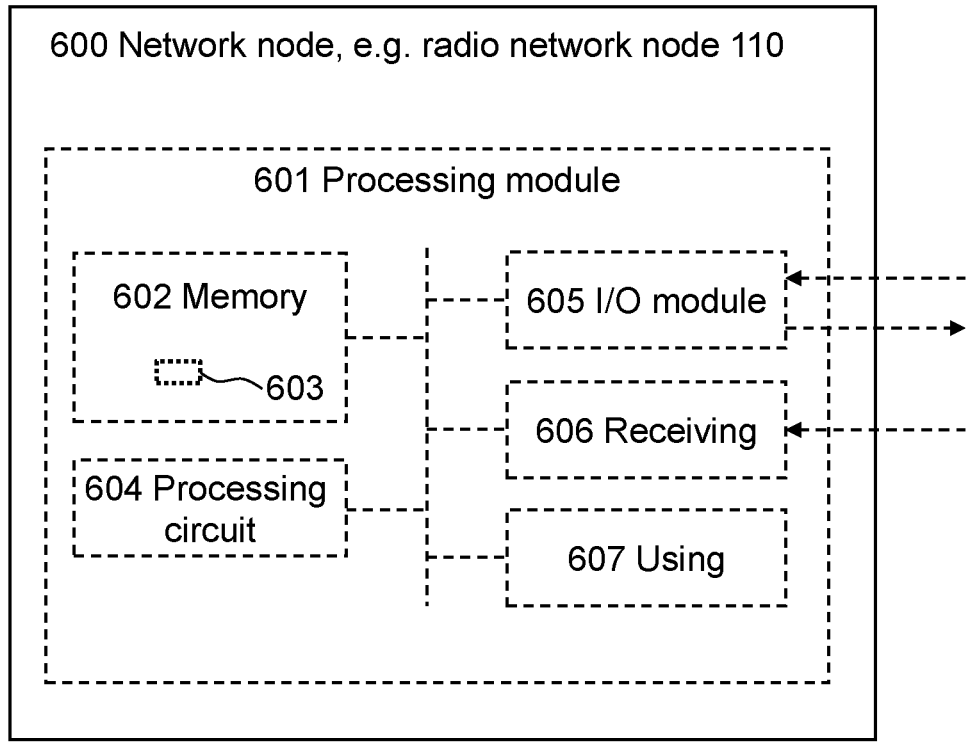

FIG. 6 is a schematic block diagram for illustrating embodiments of a network node 500, that e.g. may be the radio network node 110, and how it may be configured to perform the second method and/or actions discussed above. Hence, the network node 600 may comprise one or more of the following:

A processing module 601, such as a means, one or more hardware modules, including e.g. one or more processors, and/or one or more software modules for performing said method and/or actions.

A memory 602, which may comprise, such as contain or store, a computer program 603. The computer program 603 comprises 'instructions' or 'code' directly or indirectly executable by the network node 600 so that said method and/or actions are performed. The memory 602 may comprise one or more memory units and may be further be arranged to store data, such as configurations and/or applications involved in or for performing functions and actions of embodiments herein.

A processing circuit 604 as an exemplifying hardware module and may comprise or correspond to one or more processors. In some embodiments, the processing module 601 may comprise, e.g. is embodied in the form of or 'realized by' the processing circuit 604. In these embodiments, the memory 602 may comprise the computer program 603 executable by the processing circuit 604, whereby the network node 600 comprising it and the wireless communication network 100 is operative, or configured, to perform said method and/or actions.

An Input/Output (I/O) module 605, configured to be involved in, e.g. by performing, any communication to and/or from other units and/or nodes, such as sending and/or receiving information to and/or from other external nodes or devices. The I/O module 605 may be exemplified by an obtaining, e.g. receiving, module and/or a sending module, when applicable.

The network node 600 may also comprise other exemplifying hardware and/or software module(s) as may have been described elsewhere in the present disclosure, which module(s) may be fully or partly implemented by the respective processing circuit. For example, the network node 600 may further comprise an receiving module 606 and/or a using module 607.

The wireless communication network 100, e.g. the network node 600 and/or the processing module 601 and/or the processing circuit 604 and/or the I/O module 605 and/or the receiving module 606, are operative, or configured, to receive, from the wireless device 120, said message indicating said downlink signal information and which message is associated with the wireless device 120 requesting access to the wireless communication network 100.

In some embodiments, the wireless communication network 100, e.g. the network node 600 and/or the processing module 601 and/or the processing circuit 604 and/or the using module 607, are operative, or configured, to use the downlink signal information indicated in the received message for one or more of said purposes.

The wireless communication network 100, e.g. the network node 600, may also be configured to send information about said certain threshold and/or said certain factor, to the wireless device 120, typically as part of SI.

Figure 7A:
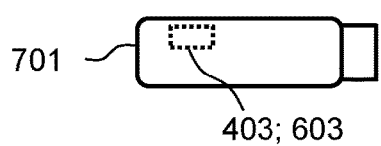
FIGS. 7a-c are schematic drawings illustrating embodiments relating to computer programs and computer readable media to cause the device and/or network node to perform the first method and/or second method, respectively.
Figure 7B:
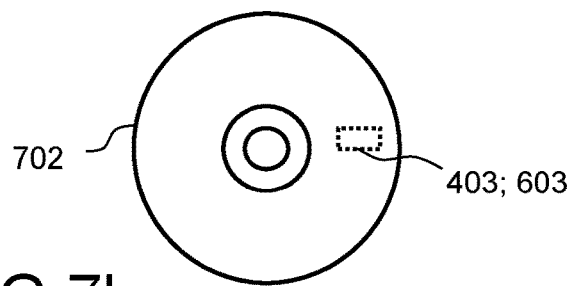
Figure 7C:
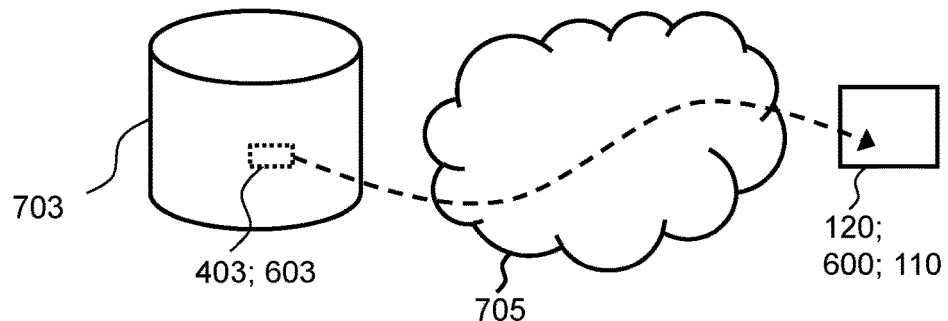

FIGS. 7a-c are schematic drawings illustrating embodiments relating to a computer program that may be any one of the computer programs 403 and 603, and that comprises instructions that when executed by the respective processing circuit 404, 604 causes the wireless communication device 120 or the network node 600 to perform the respective method as described above.

In some embodiments there is provided a computer program product, i.e. a data carrier, comprising a computer-readable medium and the computer program stored on the computer-readable medium. By computer readable medium may be excluded a transitory, propagating signal and the computer readable medium may correspondingly be named non-transitory computer readable medium. Non-limiting examples of the computer-readable medium are a memory card or a memory stick 701 as in FIG. 7a, a disc storage medium 702 such as a CD or DVD as in FIG. 7b, a mass storage device 703 as in FIG. 7c. The mass storage device 703 is typically based on hard drive(s) or Solid State Drive(s) (SSD). The mass storage device 703 may be such that is used for storing data accessible over a computer network 705, e.g. the Internet or a Local Area Network (LAN).

Each computer program 403, 603, may furthermore be provided as a pure computer program or comprised in a file or files. The file or files may be stored on the computer-readable medium and e.g. available through download e.g. over the computer network 705, such as from the mass storage device 703 via a server. The server may e.g. be a web or File Transfer Protocol (FTP) server. The file or files may e.g. be executable files for direct or indirect download to and execution on the a node for carrying out the respective method, e.g. by the processing circuit 404 or 604, or may be for intermediate download and compilation to make them executable before further download and execution causing the node(s) to perform the respective method as described above.

Note that any processing module(s) mentioned in the foregoing may be implemented as a software and/or hardware module, e.g. in existing hardware and/or as an Application Specific integrated Circuit (ASIC), a field-programmable gate array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analog and digital circuits, and/or one or more processors configured with software and/or firmware, e.g. stored in memory, that, when executed by the one or more processors make the first node and the second node to be configured to and/or to perform the above-described methods, respectively.

Identification by any identifier herein may be implicit or explicit. The identification may be unique in the wireless communication network 100 or at least in a part or some area thereof.

The term "network node" as used herein may as such refer to any type of radio network node, described below, or any network node, which may communicate with at least a radio network node. Examples of such network nodes include any radio network node stated above, a core network node, Operations & Maintenance (O&M), Operations Support Systems (OSS), Self Organizing Network (SON) node, positioning node etc.

The term "radio network node" as used herein may as such refer to any type of network node serving a wireless device and/or that are connected to other network node(s) or network element(s) or any radio node from which a wireless device receives signals. Examples of radio network nodes are Node B, Base Station (BS), Multi-Standard Radio (MSR) node such as MSR BS, eNB, eNodeB, network controller, RNC, Base Station Controller (BSC), relay, donor node controlling relay, Base Transceiver Station (BTS), Access Point (AP), transmission points, transmission nodes, nodes in Distributed Antenna System (DAS) etc.

The term "wireless device" as used herein, may as such refer to any type of wireless device arranged to communicate with a radio network node in a wireless, cellular and/or mobile communication system, such as the wireless communication network 100, and may thus be referred to as a wireless communication device. Examples include: target devices, device to device UE, device for Machine Type of Communication (MTC), MTC device, machine type UE or UE capable of machine to machine (M2M) communication, Personal Digital Assistant (PDA), iPAD, Tablet, mobile terminals, smart phone, Laptop Embedded Equipment (LEE), Laptop Mounted Equipment (LME), Universal Serial Bus (USB) dongles etc. While said terms are used frequently herein for convenience, or in the context of examples involving other 3GPP nomenclature, it must be appreciated that the term as such is non-limiting and the teachings herein apply to essentially any type of wireless device.

The term "node" as used herein may as such refer to any type of network node or wireless device, such as described above.

Note that with regard to the downlink, the term "transmitter" may be used herein to refer to a radio network node, e.g. base station, and the term "receiver" may refer to a wireless device.

Note that although terminology used herein may be particularly associated with and/or exemplified by certain cellular communication systems, wireless communication networks etc., depending on terminology used, such as wireless communication networks based on 3GPP, this should as such not be seen as limiting the scope of the embodiments herein to only such certain systems, networks etc.

As used herein, the term "memory" may refer to a hard disk, a magnetic storage medium, a portable computer diskette or disc, flash memory, random access memory (RAM) or the like. Furthermore, the memory may be an internal register memory of a processor.

Also note that any enumerating terminology such as first network node, second network node, first base station, second base station, etc., that may have been used herein, as such should be considering non-limiting and the terminology as such does not imply a certain hierarchical relation. Without any explicit information in the contrary, naming by enumeration should be considered merely a way of accomplishing different names.

As used herein, the expression "configured to" may mean that a processing circuit is configured to, or adapted to, by means of software or hardware configuration, perform one or more of the actions described herein.

As used herein, the terms "number", "value" may be any kind of digit, such as binary, real, imaginary or rational number or the like. Moreover, "number", "value" may be one or more characters, such as a letter or a string of letters. Also, "number", "value" may be represented by a bit, a bit string or word.

As used herein, the expression "in some embodiments" has been used to indicate that the features of the embodiment described may be combined with any other embodiment disclosed herein.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the present disclosure, which is defined by the appending claims.

The invention claimed is:

1. A method, performed by a wireless device operating in a wireless communication network, wherein the method comprises:
   receiving, from the wireless communication network, a parameter indicating a factor;
   obtaining downlink signal information, the downlink signal information being a signal quality or a signal strength for a signal received by the wireless device;
   determining a range parameter indicating by how much the downlink signal information exceeds a predetermined threshold, wherein the range parameter depends on the factor; and
   sending the range parameter to the wireless communication network in a message associated with the wireless device requesting access to the wireless communication network, wherein said downlink signal information is represented by a value indicating said signal quality or signal strength, and the range parameter indicates by how much this value exceeds the predetermined threshold.

2. The method of claim 1, wherein the wireless device has received method further comprises receiving information indicative of the predetermined threshold from the wireless communication network.

3. The method of claim 1, wherein the predetermined threshold corresponds to a radio coverage level associated with the wireless device.

4. The method of claim 3, wherein said message also indicates the radio coverage level.

5. The method of claim 4, wherein the range parameter and the indication of the radio coverage level are encoded in a single code word comprised in said message.

6. The method of claim 3, wherein the wireless communication network is a Global System for Mobile communications (GSM) network that supports Extended Coverage GSM for Internet of Things (EC-GSM-IoT), wherein the radio coverage level is a Coverage Class (CC) indicating that the wireless device is in a normal coverage.

7. A non-transitory computer-readable medium comprising, stored thereupon, a computer program comprising instructions that, when executed by a wireless device, cause the wireless device to perform the method of claim 1.

8. A method, performed by a wireless communication network, wherein the method comprises:
   receiving, from a wireless device, a message associated with the wireless device requesting access to the wireless communication network, wherein the message indicates a range parameter that indicates by how much a downlink signal measurement exceeds a predetermined threshold, the downlink signal measurement being a measured signal quality or signal strength for a signal received by the device; and
   determining the downlink signal measurement from the range parameter, based on a parameter indicating a factor, the parameter having been provided to the wireless device, wherein said downlink signal measurement is represented by a value indicating said measured quality or signal strength, and the range parameter indicates by how much this value exceeds the predetermined threshold.

9. The method of claim 8, wherein the method further comprises:
   using the downlink signal measurement indicated in the received message for one or more of the following purposes:
      optimizing an initial downlink and/or uplink modulation for the wireless device, and/or
      selecting a modulation and/or coding scheme for the wireless device, and/or
      assigning resources to the wireless device, and/or
      selecting and/or assigning downlink and/or uplink power levels for the wireless device.

10. The method of claim 8, further comprising sending an indication of the predetermined threshold to the wireless device.

11. The method of claim 8, wherein the predetermined threshold is associated with a radio coverage level associated with the wireless device.

12. The method of claim 11, wherein said message also indicates the radio coverage level.

13. The method of claim 12, wherein the range parameter and the indication of the radio coverage level are encoded in a single code word comprised in said message.

14. The method of claim 11, wherein the wireless communication network is a Global System for Mobile communications (GSM) network that supports Extended Coverage GSM for Internet of Things (EC-GSM-IoT), wherein the radio coverage level is a Coverage Class (CC) indicating that the wireless device is in a normal coverage.

15. The method of claim 8, wherein the method is performed by a network node comprised in the wireless communication network.

16. A non-transitory computer-readable medium comprising, stored thereupon, a computer program comprising instructions that, when executed by a network node comprised in the wireless communication network, cause the wireless communication network to perform the method of claim 8.

17. The method of claim 8, wherein the method further comprises sending the parameter indicating the factor to the wireless device.

18. A wireless device, comprising a processing circuit and a memory operatively coupled to the processing circuit and comprising program instructions for execution by the processing circuit, whereby the processing circuit is configured to:
  receive, from a wireless communication network, a parameter indicating a factor;
  obtain downlink signal information, the downlink signal information being a signal quality or a signal strength for a signal received by the wireless device;
  determine a range parameter indicating by how much the downlink signal information exceeds a predetermined threshold, wherein the range parameter depends on the factor; and
  send the range parameter to the wireless communication network in a message associated with the wireless device requesting access to the wireless communication network, wherein said downlink signal measurement is represented by a value indicating said signal quality or signal strength, and the range parameter indicates by how much this value exceeds the predetermined threshold.

19. The wireless device of claim 18, wherein the processing circuit is configured to receive information indicative of the predetermined threshold from the wireless communication network.

20. The wireless device of claim 18, wherein the predetermined threshold corresponds to a radio coverage level associated with the wireless device.

21. The wireless device of claim 20, wherein said message also indicates the radio coverage level.

22. The wireless device of claim 20, wherein the range parameter and the indication of the radio coverage level are encoded in a single code word comprised in said message.

23. The wireless device of claim 20, wherein the wireless communication network is a Global System for Mobile communications (GSM) network that supports Extended Coverage GSM for Internet of Things (EC-GSM-IoT), wherein the radio coverage level is a Coverage Class (CC) indicating that the wireless device is in a normal coverage.

24. A network node, wherein the network node comprises a processing circuit and a memory operatively coupled to the processing circuit and comprising program instructions for execution by the processing circuit, whereby the processing circuit is configured to:
  receive, from a wireless device, a message associated with the wireless device requesting access to the wireless communication network, wherein the message indicates a range parameter that indicates by how much a downlink signal measurement exceeds a predetermined threshold, the downlink signal measurement being a measured signal quality or signal strength for a signal received by the device; and
  determined the downlink signal measurement from the range parameter, based on a parameter indicating a factor, the parameter having been provided to the wireless device, wherein said downlink signal measurement is represented by a value indicating said measured signal quality or signal strength, and the range parameter indicates by how much this value exceeds the predetermined threshold.

25. The network node of claim 24, wherein the processing circuit is further configured to:
  use the downlink signal measurement indicated in the received message for one or more of the following purposes:
    optimizing an initial downlink and/or uplink modulation for the wireless device, and/or
    selecting a modulation and/or coding scheme for the wireless device, and/or
    assigning resources to the wireless device, and/or
    selecting and/or assigning downlink and/or uplink power levels for 10 the wireless device.

26. The network node of claim 24, wherein the processing circuit is further configured to send an indication of the predetermined threshold to the wireless device.

27. The network node of claim 26, wherein the predetermined threshold is associated with a certain radio coverage level associated with the wireless device.

28. The network node of claim 27, wherein said message also indicates the radio coverage level.

29. The network node of claim 28, wherein the range parameter and the indication of the radio coverage level are encoded in a single code word comprised in said message.

30. The network node of claim 29, wherein the wireless communication network is a Global System for Mobile communications (GSM) network that supports Extended Coverage GSM for Internet of Things (EC-GSM-IoT), wherein the radio coverage level is a Coverage Class (CC) indicating that the wireless device is in a normal coverage.

* * * * *